United States Patent
Umuroglu et al.

(10) Patent No.: US 12,067,484 B2
(45) Date of Patent: Aug. 20, 2024

(54) LEARNING NEURAL NETWORKS OF PROGRAMMABLE DEVICE BLOCKS DIRECTLY WITH BACKPROPAGATION

(71) Applicant: Xilinx, Inc., San Jose, CA (US)

(72) Inventors: Yaman Umuroglu, Islandbridge (IE); Nicholas Fraser, Dublin (IE); Michaela Blott, Malahide (IE); Kristof Denolf, Longmont, CO (US); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 1001 days.

(21) Appl. No.: 16/449,264

(22) Filed: Jun. 21, 2019

(65) Prior Publication Data

US 2020/0401882 A1      Dec. 24, 2020

(51) Int. Cl.
  *G06N 3/063* (2023.01)
  *G06N 3/08* (2023.01)
  *G06N 3/082* (2023.01)
  *G06N 3/084* (2023.01)

(52) U.S. Cl.
  CPC .............. *G06N 3/08* (2013.01); *G06N 3/063* (2013.01); *G06N 3/082* (2013.01); *G06N 3/084* (2013.01)

(58) Field of Classification Search
  CPC ........ G06N 3/063; G06N 3/082; G06N 3/084; G06N 3/08
  See application file for complete search history.

(56) References Cited

FOREIGN PATENT DOCUMENTS

JP    H04289957 A    10/1992

OTHER PUBLICATIONS

Li, Z., Ding, C., Wang, S., Wen, W., Zhuo, Y., Liu, C., . . . & Wang, Y. (Feb. 2019). E-RNN: Design optimization for efficient recurrent neural networks in FPGAs. In 2019 IEEE International Symposium on High Performance Computer Architecture (HPCA) (pp. 69-80). IEEE. (Year: 2019).*

Imani, M., Samragh, M., Kim, Y., Gupta, S., Koushanfar, F., & Rosing, T. (2018). Rapidnn: In-memory deep neural network acceleration framework. arXiv preprint arXiv:1806.05794. (Year: 2018).*

Liu, B., Qin, H., Gong, Y., Ge, W., Xia, M., & Shi, L. (2018). EERA-ASR: An energy-efficient reconfigurable architecture for automatic speech recognition with hybrid DNN and approximate computing. IEEE Access, 6, 52227-52237. (Year: 2018).*

Chang, A. X. M., Martini, B., & Culurciello, E. (2015). Recurrent neural networks hardware implementation on FPGA. arXiv preprint arXiv:1511.05552. (Year: 2016).*

(Continued)

*Primary Examiner* — Kamran Afshar
*Assistant Examiner* — Lokesha G Patel
(74) *Attorney, Agent, or Firm* — Patterson + Sheridan, LLP

(57) ABSTRACT

An example method of training a neural network includes defining hardware building blocks (HBBs), neuron equivalents (NEQs), and conversion procedures from NEQs to HBBs; defining the neural network using the NEQs in a machine learning framework; training the neural network on a training platform; and converting the neural network as trained into a netlist of HBBs using the conversion procedures to convert the NEQs in the neural network to the HBBs of the netlist.

24 Claims, 9 Drawing Sheets

(56) References Cited

OTHER PUBLICATIONS

Ereri Wang et al., "LUTNet: Rethinking Inference in FPGA Soft Logic" Arxiv, Org, Cornell University Ithaca, NY 14853, Apr. 1, 2019, XP 081163444, abstract; figures 1, 2, 7 I, Lines 20-33 p. 2, col. 1, Lines 3-22.
Javier Duarte et al : "Fast inference of deep neural networks in FPGAs for particle physics", arxiv.org, Cornell University Library, 201 Olin Library Cornell University Ithaca, NY 14853, Apr. 16, 2018 (Apr. 16, 2018), XP081141541, DOI: 10.1088/1748-0221/13/07/P07027 figures 1, 13 2.1, l ines 4-9 p. 2, l ines 26-31 p. 5, l ines 7-9 p. 5, l ines 19-35 p. 8, l ines 6-16 p. 11, l i ne 24—p. 12, line 12 Equation 2.1.
Yaman Umuroglu et al : "LogicNets: Co-Desi gned Neural Networks and Circuits for Extreme-Throughput Applications", arxi v.org, Corn ell University Library, 201 Olin Library Cornell University Ithaca, NY 14853, Apr. 7, 2020 (Apr. 7, 2020), XP081638978, abstract; figure 4 p. 1, col. 2, l ines 8-37.
Zhao Ruizhe et al : "Hardware Compilation of Deep Neural Networks: An Overview", 2018 I EEE 29th International Conference on Appli aation-Speci fic Systems, Architectu res and Processors (ASAP) , IEEE, Jul. 10, 2018 (Jul. 10, 2018), pp. 1-8, XP033393090, DOI: 10.1109/ASAP .2018.8445088 [retri eved on Aug. 23, 2018].
Yaman Umuroglu et al : 11 FINN : A Framework for Fast, Scal able Binarized Neural Network Inference, Proceedings of The 2017 ACM/SIGDA International Symposium on Field-Programmable Gate Arrays, FPGA '17, Jan. 1, 2017 (Jan. 1, 2017), pp. 65-74, XP055533133, New York, New York, USA DOI: 10.1145/3020078.3021744 ISBN: 978-1-4503-354-1.
Mahdi Nazemi et al : 11 NullaNet: Training Deep Neural Networks for Reduced-Memory-Access Inference, arxi v.org, Cornell University Library, 201 Olin Library Cornell University Ithaca, NY 14853, Jul. 23, 2018 (Jul. 23, 2018), XP081262125.
Bengio, Yoshua et al., Estimating or propagating gradients through stochastic neurons. Technical Report arXiv:1305.2982, Universite de Montreal, 2013, 12 pages.
Prabhu, Ameya, et al. "Deep Expander Networks: Efficient Deep Networks from Graph Theory", Center for Visual Information Technology, Kohli Center on Intelligent Systems. IIIT Hyderabad, India. arXiv preprint arXiv: 1711.08757, Jul. 26, 2018, 23 pages.
Courbariaux, Matthieu, et al. "Binarized Neural Networks: Training Neural Networks with Weights and Activations Constrained to +1 or −1", arXiv preprint arXiv: 1602.02830, Mar. 17, 2016, 11 pages.
Nazemi, Mahdi, et al. "NullaNet: Training Deep Neural Networks for Reduced-Memort-Access Inference", Jul. 23, 2018, 7 pages, Los Angeles, CA USA.
Hubara, Itay, et al. "Quantized Neural Networks: Training Neural Networks with Low Precision Weights and Activations", Journal of Machine Learning Research Apr. 18, 2018, pp. 1-30.
Office Action from Indian Patent Application No. 202247002540 dated Jan. 4, 2024.
Office Action from Japanese Patent Application No. 2021-576147 dated Apr. 9, 2024.
Erwei Wang et al., LUTNet: Rethinking Inference in FPGA Soft Logic, arXiv [online], verson 1, Apr. 1, 2019, pp. 1-9, [searched Mar. 28, 2024] <Internet: https://arxiv.org/abs/1904.00938>.

* cited by examiner

LEARNING NEURAL NETWORKS OF PROGRAMMABLE DEVICE BLOCKS DIRECTLY WITH BACKPROPAGATION

TECHNICAL FIELD

Examples of the present disclosure generally relate to neural networks and, in particular, to learning neural networks of programmable device blocks directly with backpropagation.

BACKGROUND

As the size of deep neural networks (DNNs) continues to grow to improve their prediction capabilities, their memory and computational footprints also scale up, making them increasingly difficult to deploy in energy and resource constrained hardware environments. DNNs that use floating-point arithmetic contain significant redundancy, which can be exploited to reduce the compute and memory cost. These techniques include quantization, pruning, and low-rank decompositions. Among the proposed techniques for quantization, trained quantization methods (where the DNN is quantized during the training process) has yielded some of the most promising results in terms of reducing the workload while maintaining the accuracy in the form of quantized neural networks (QNNs). The most extreme form of quantization is binary neural networks (BNNs), where the weights and activations are constrained to binary values, lowering the compute and memory cost significantly while retaining high accuracy.

Previously, the strategy for creating a DNN accelerator for a programmable device, such as a field programmable gate array (FPGA), is to map the artificial neurons to a fixed hardware architecture by placing the learned parameters in memory and scheduling the operations so that the correct computations take place between the corresponding weights and activations. In turn, the fixed hardware architecture is implemented using lookup tables (LUTs), digital signal processors (DSPs), and other programmable device resources. Viewing the problem as a whole, the fixed architecture acts as an interface between the capabilities of the fabric and the computing that the DNN performs. However, this interface also acts as a barrier to optimizations that can enable the DNN to take full advantage of the programmable device fabric. Furthermore, the fixed architecture requires a non-trivial optimizing compiler that maps and schedules the DNN computation onto the hardware, which can result in further performance degradation.

SUMMARY

Techniques for learning neural networks of programmable device blocks directly with backpropagation are described. In an example, a method of training a neural network includes: defining hardware building blocks (HBBs), neuron equivalents (NEQs), and conversion procedures from NEQs to HBBs; defining the neural network using the NEQs in a machine learning framework; training the neural network on a training platform; and converting the neural network as trained into a netlist of HBBs using the conversion procedures to convert the NEQs in the neural network to the HBBs of the netlist.

In another example, a non-transitory computer readable medium having stored thereon instructions that when executed by a processor cause the processor to perform a method of training a neural network, comprising: defining hardware building blocks (HBBs), neuron equivalents (NEQs), and conversion procedures from NEQs to HBBs; defining the neural network using the NEQs in a machine learning framework; training the neural network on a training platform; and converting the neural network as trained into a netlist of HBBs using the conversion procedures to convert the NEQs in the neural network to the HBBs of the netlist.

In another example, a computing system includes a system memory configured to store code implementing design tools; a training platform; and a processor coupled to the system memory and the training platform, the processor configured to execute the code to perform training of a neural network by: defining hardware building blocks (HBBs), neuron equivalents (NEQs), and conversion procedures from NEQs to HBBs; defining the neural network using the NEQs in a machine learning framework; training the neural network on the training platform; and converting the neural network as trained into a netlist of HBBs using the conversion procedures to convert the NEQs in the neural network to the HBBs of the netlist.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
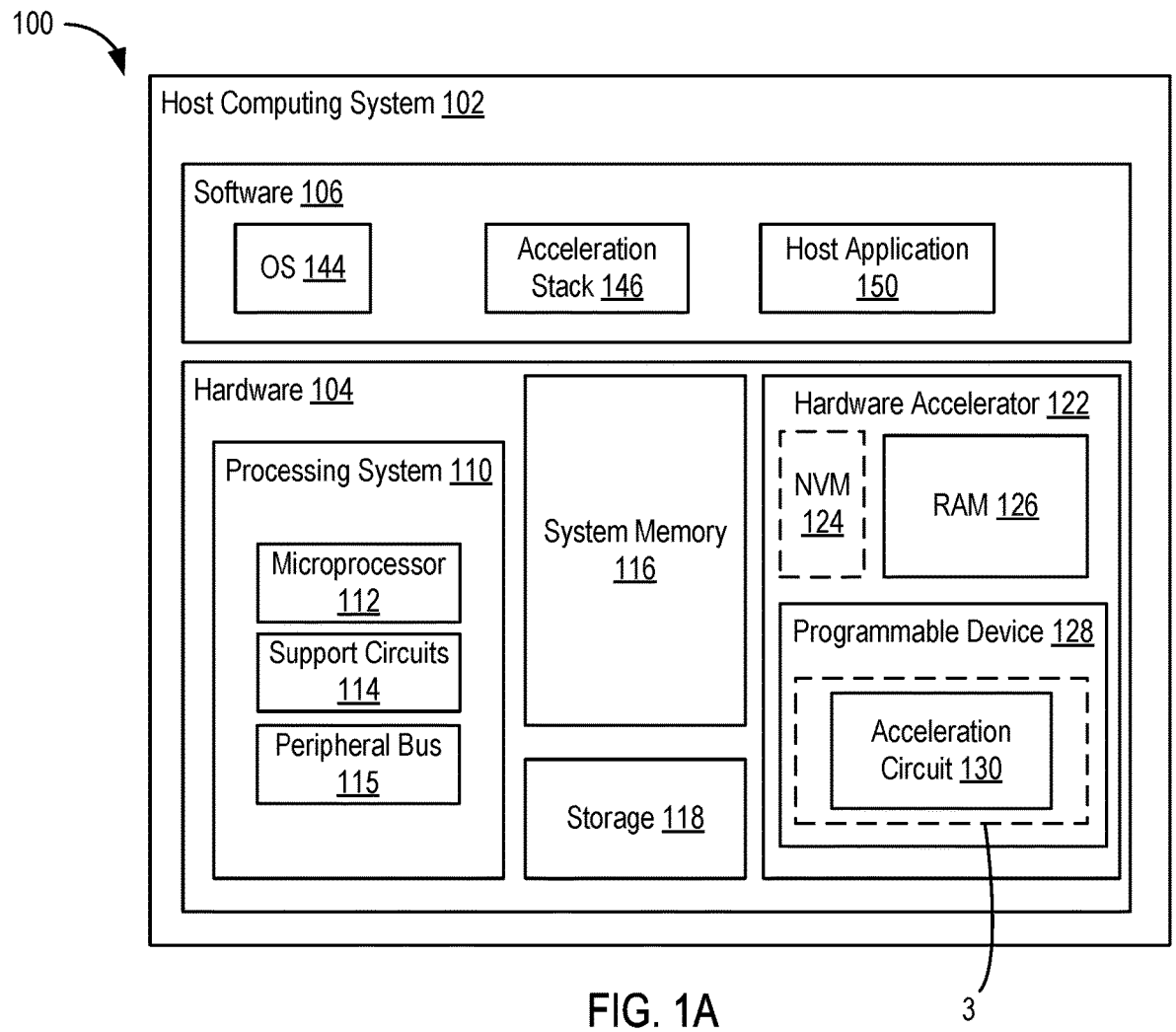
FIG. 1A is a block diagram depicting a hardware acceleration system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for learning neural networks of programmable device blocks directly with backpropagation are described. The techniques expose the building blocks of a programmable device fabric (e.g., lookup tables (LUTs), block random access memories (BRAMs), and combinations of these) directly to a machine learning framework. The techniques allow deep neural networks (DNNs) to be customized during the training phase in a manner that directly maps to an efficient programmable device hardware implementation, without the need to define a custom overlay architecture or a scheduling tool. In essence, the techniques reflect the capabilities of the programmable device fabric in the topology of the neural network by using artificial neurons with quantized inputs, quantized outputs, and arbitrary weights. Once the network is trained, each neuron can be mapped into the truth table of a single building block. The resulting netlist can be placed-and-routed onto the programmable fabric of a device of sufficient size as a highly-pipelinable, massively parallel circuit implementing the same neural network. These and other aspects are described below with respect to the drawings.

FIG. 1A is a block diagram depicting a hardware acceleration system 100 according to an example. The hardware acceleration system 100 includes a host computing system 102. The host computing system 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, an acceleration stack 146, a host application 150, and competing threads 139.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a basic input-output system (BIOS)), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SOC), or the like, which absorbs all or a substantial portion of the functionality of the chipset (e.g., north bridge, south bridge, etc.). The peripheral bus 115 can implement an expansion bus standard, such as Peripheral Component Interconnect Express (PCIe) or the like.

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

In an example, the hardware accelerator 122 includes a programmable device 128 and RAM 126. The hardware accelerator 122 can optionally include a non-volatile memory (NVM) 124. The programmable device 128 can be a field programmable gate array (FPGA) or an SOC having FPGA programmable logic along with other embedded subsystems. The NVM 124 can include any type of non-volatile memory, such as flash memory or the like. The RAM 126 can include DDR DRAM or the like. The RAM 126 can be organized into discrete RAM banks 127, as described further below. The programmable device 128 is coupled to the NVM 124 and the RAM 126. The programmable device 128 is also coupled to the peripheral bus 115 of the processing system 110.

The OS 144 can be any commodity operating system known in the art, such as such as Linux®, Microsoft Windows®, Mac OS®, or the like. The acceleration stack 146 includes drivers and libraries that provide application programming interfaces (APIs) to the hardware accelerator 122 for command and control thereof.

Figure 1B:
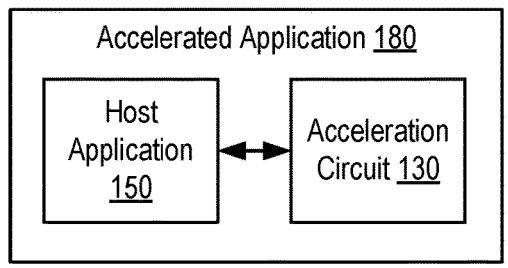
FIG. 1B is a block diagram depicting an accelerated application according to an example.

FIG. 1B is a block diagram depicting an accelerated application 180 according to an example. The accelerated application 180 includes the host application 150 and an acceleration circuit 130. The acceleration circuit 130 is programmed in programmable logic (PL) 3 of the programmable device 128 on the hardware accelerator 122. The host application 150 includes software executing on the microprocessor 112 that invokes the acceleration circuit 130 using API calls to the acceleration stack 146 to perform some work. The host application 150 can include neural network, video processing, network processing, or the like type applications that offload some functions to the hardware accelerator 122.

Figure 2:
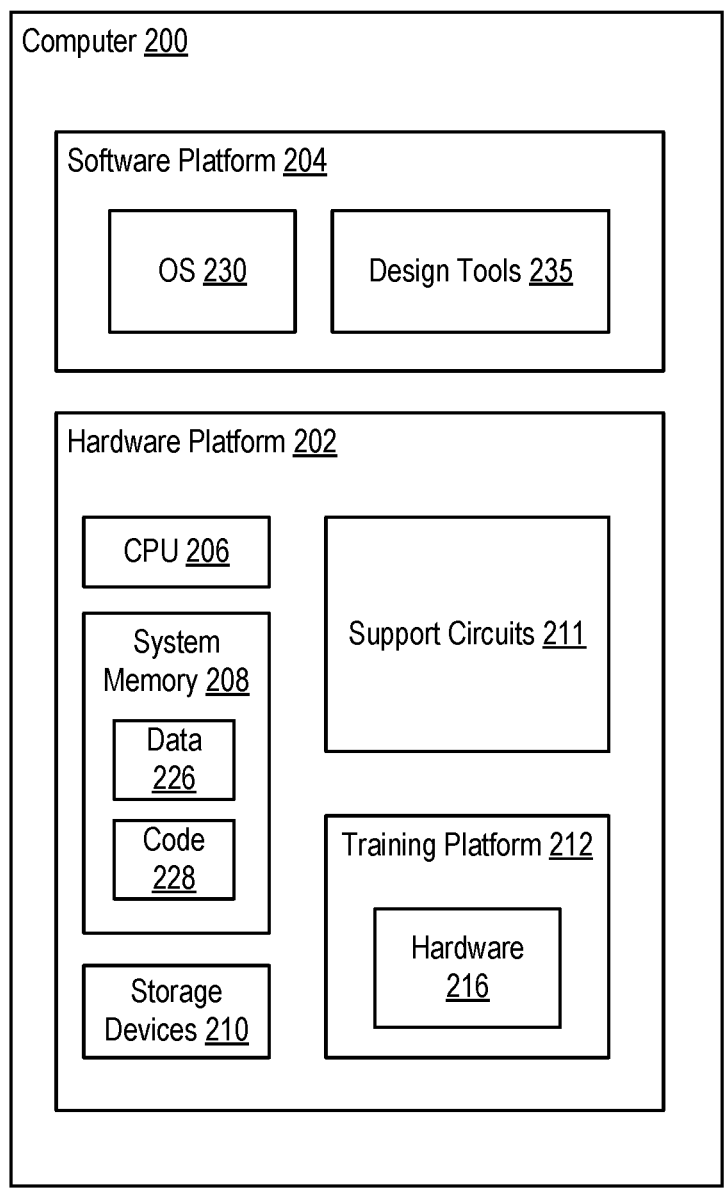
FIG. 2 is a block diagram depicting a computing system ("computer") according to an example.

FIG. 2 is a block diagram depicting a computing system ("computer 200") according to an example. The computer 200 includes a software platform 204 executing on a hardware platform 202. The hardware platform 202 includes a central processing unit (CPU) 206, a system memory 208, storage devices 210, support circuits 211, and a training platform 212. The software platform 204 includes an operating system (OS) 230 and design tools 235.

The CPU 206 can be any type of general-purpose central processing unit (CPU), such as an x86-based processor, ARM®-based processor, or the like. The CPU 206 can include one or more cores and associated circuitry (e.g., cache memories, memory management units (MMUs), interrupt controllers, etc.). The CPU 206 is configured to execute program code that perform one or more operations described herein and which can be stored in the system memory 208 and/or the storage devices 210. The support circuits 211 include various devices that cooperate with the CPU 206 to manage data flow between the CPU 206, the system memory 208, the storage devices 210, the training platform 212, the hardware accelerator 214, or any other peripheral device. For example, the support circuits 211 can include a chipset (e.g., a north bridge, south bridge, platform host controller, etc.), voltage regulators, firmware (e.g., a BIOS), and the like. In some examples, the CPU 206 can be a System-in-Package (SiP), System-on-Chip (SoC), or the like, which absorbs all or a substantial portion of the functionality of the chipset (e.g., north bridge, south bridge, etc.).

The system memory 208 is a device allowing information, such as executable instructions and data, to be stored and retrieved. The system memory 208 can include, for example, one or more random access memory (RAM) modules, such as double-data rate (DDR) dynamic RAM (DRAM). The system memory 208 can store data 226 and program code ("code 228") processed and executed by the CPU 206 to implement the software platform 204. The storage devices 210 includes local storage devices (e.g., one or more hard disks, flash memory modules, solid state disks, and optical disks) and/or a storage interface that enables the computer 200 to communicate with one or more network data storage systems. The hardware platform 202 can include various other conventional devices and peripherals of a computing system, such as graphics cards, universal serial bus (USB) interfaces, and the like.

The training platform 212 includes hardware 216, which can include processor(s), memory, input/output (IO) circuits, and the like. In an example, hardware 216 includes a graphics processing unit (GPU) and associated support circuitry. In another example, hardware 216 can include an application specific integrated circuit (ASIC), programmable IC, or the like along with associated support circuitry. In an example, training platform 212 is more performant than the hardware accelerator 122, but also consumes more energy than the hardware accelerator 122. The training platform 212 can be used to train neural networks.

The OS 230 can be any commodity operating system known in the art, such as such as Linux®, Microsoft Windows®, Mac OS, or the like. The design tools 235 include software that trains neural networks on the training platform 212 and implements neural networks for target programmable devices.

Figure 3:
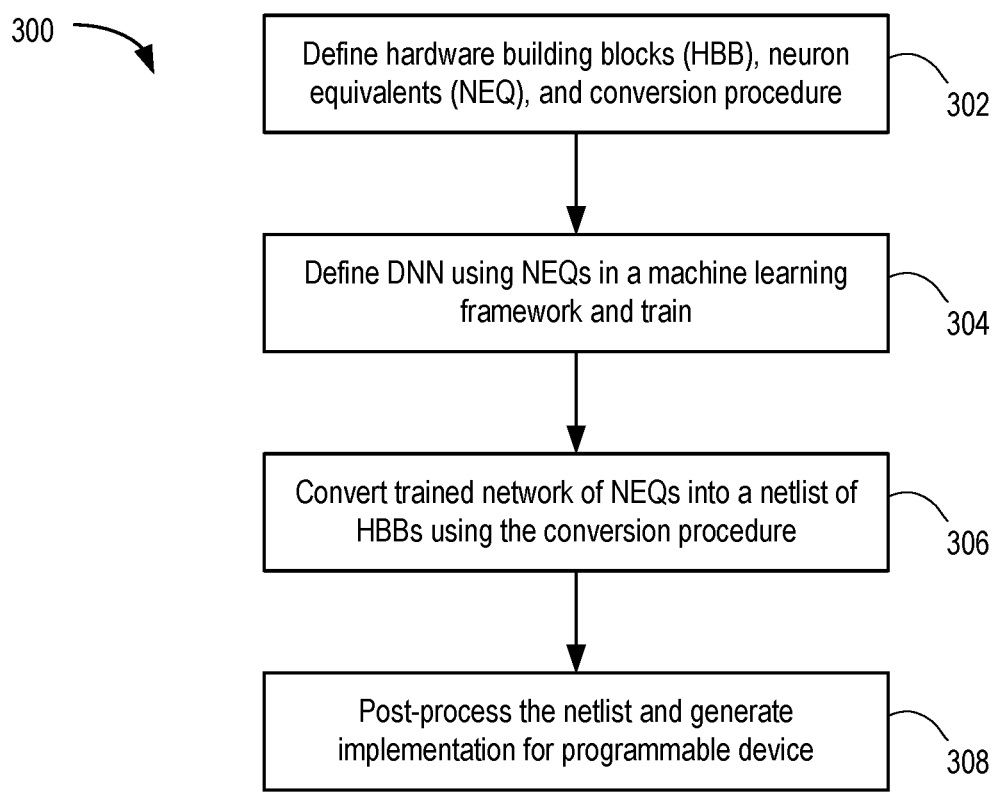
FIG. 3 is a flow diagram depicting a method of training a neural network according to an example.

FIG. 3 is a flow diagram depicting a method 300 of training a neural network according to an example. The method 300 can be performed by the design tools 235 on the computer 200 described above. The method 300 begins at step 302, where the design tools 235 define hardware building blocks (HBBs), neuron equivalents (NEQs), and conversion procedures.

An HBB is a primitive available in the programmable device fabric that is capable of implementing a truth table. For example, a programmable fabric can include lookup tables (LUTs), block RAMs (BRAMs), and the like. The HBBs implement truth tables of different sizes. The number of input bits to the HBB truth tables is denoted as $B_A$. The number of output bits (i.e., the number of different output variables) is denoted as $B_W$. The content of the truth table is referred to as the configuration of the HBB. In general, any memory component can implement a truth table of a certain size and can be used as an HBB.

An NEQ is a computational graph expressed in a machine learning framework. In an example, an NEQ includes multiply-accumulate operations on inputs and learnable parameters followed by a nonlinear function. NEQs include quantized inputs and outputs, but can have floating-point parameters. Each NEQ is mathematically equivalent to a single HBB and can be converted into a single HBB via the conversion procedure. In general, a memory device is able to handle any form of reduction so long as the following condition is met: $\Sigma_{i=0}^{C_{in}} B_i \geq B_A$, where $B_A$ is the number of address bits of the memory component, $C_{in}$ is the number of input channels, and $B_i$ is the number of bits used for the ith input channel. An NEQ can include any number of element-wise operations or non-element-wise operations so long as the last operation meets the following constraint: $\Sigma_{O=0}^{C_{out}} B_O \leq B_W$, where $C_{out}$ is the number of output channels, $B_O$ is the number of bits for the oth output channel, and $B_W$ is the number of output bits (e.g., the memory width). Each NEQ includes parameters that can be learned using gradient methods, such as standard backpropagation. Thus, the NEQ includes only semi-differentiable functions.

The conversion procedure takes an NEQ with trained parameters and outputs an HBB in its configuration. The type of HBB that an NEQ maps to is statically determined (i.e., each NEQ type maps to only one HBB type). Since NEQs have quantized inputs and outputs, the configuration of the HBB (i.e., the truth table) can be produced simply by evaluating all permutations of the inputs for the trained NEQ and observing the output. Each (input, output) pair becomes one line of the truth table.

Example HBBs and NEQs are described below. For example, consider a 6-to-1 LUT, where $B_A=6$ and $B_W=1$. Other types of LUT configurations can also be used if they are available in the target device. In general, each NEQ can include a dot product operation and a nonlinear operation (e.g., thresholding operation). Optionally, an NEQ can include one or more additional operations, such as an elementwise operation (e.g., batch normalization) between the dot product operation and the nonlinear operation. Such an NEQ maps to a LUT. The conversion includes enumerating each possible input (e.g., here 2^6=64 possibilities), evaluate the trained equation for each possible input, and enter the (input, output) pair into the HBB truth table.

In another example, a BRAM is used as an HBB. While a BRAM is described, any type of RAM element in the fabric can be used. A BRAM can be configured in many different ways, in each instance functioning as a memory device. For example, consider a BRAM that can be configured as two independent 18k memories or as one single 36k memory. Further, each of these configurations can have several modes that vary the number of bits per word and the capacity of the memory (e.g., 16k 1-bit words, 8k 2-bit words, etc. for 18k configuration) and (e.g., 32k 1-bit words, 16k 2-bit words, etc. for 36k configuration). In such an example, for the 2×18k configuration, the following $B_A/B_W$ combinations are supported: 14/1, 13/2, 12/4, 11/9, 10/18, and 9/36. Note that in this configuration there are effectively two parallel NEQs, each supporting an independent $B_A/B_W$ mode, as listed above. For the 1×36k configuration, the following $B_A/B_W$ combinations are supported: 15/1, 14/2, 13/4, 12/9, 11/18, 10/36, and 9/72. The NEQs that can be mapped to a BRAM are similar to those mappable to a LUT. However, unlike the 6-to-1 LUT, BRAMs can produce higher bitwidth outputs. Similar to LUT-based NEQs, any number of element-wise operations can be included so long as the constraint of $B_W$ is met.

Figure 4:
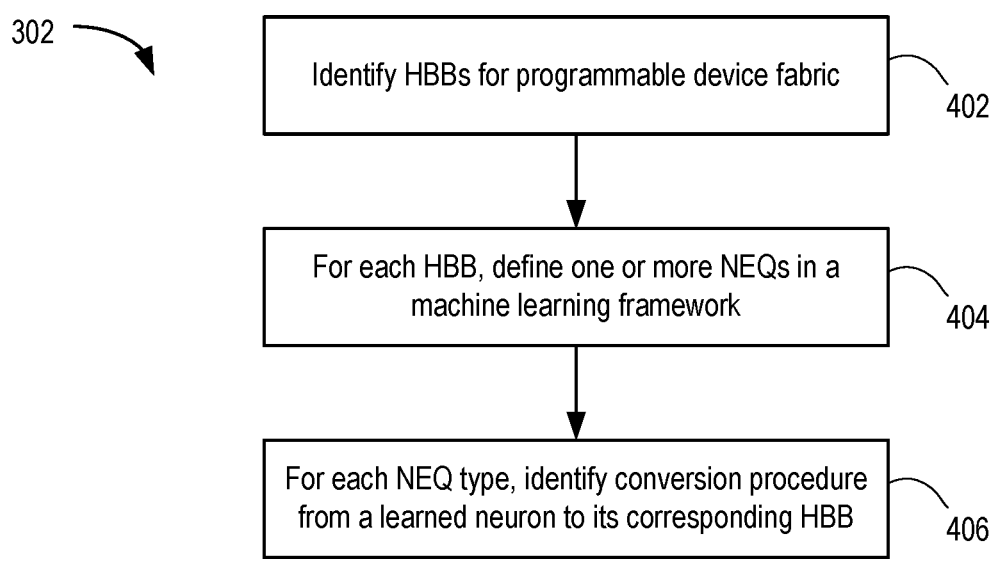
FIG. 4 is a flow diagram depicting a method of performing a portion of the method shown in FIG. 3 according to an example.

FIG. 4 is a flow diagram depicting a method of performing step 302 in the method 300 according to an example. At step 402, the design tools 235 identify HBBs for a given programmable device fabric. At step 404, for each HBB, the design tools 235 define one or more NEQs in a machine learning framework. Each NEQ is trainable using backpropagation. At step 406, for each NEQ type, the design tools 235 identify a conversion procedure from a learned neuron to its corresponding HBB.

Returning to FIG. 3, at step 304, a user interacts with the design tools 235 to define a DNN using NEQs in a machine learning framework and trains the DNN. Example machine learning frameworks include PyTorch, TensorFlow, or the like. Using available NEQs identifying in step 302, the user constructs a DNN topology by instantiating NEQs and connecting them together. The topology can be trained on a labeled dataset in the machine learning framework using backpropagation.

Figure 5:
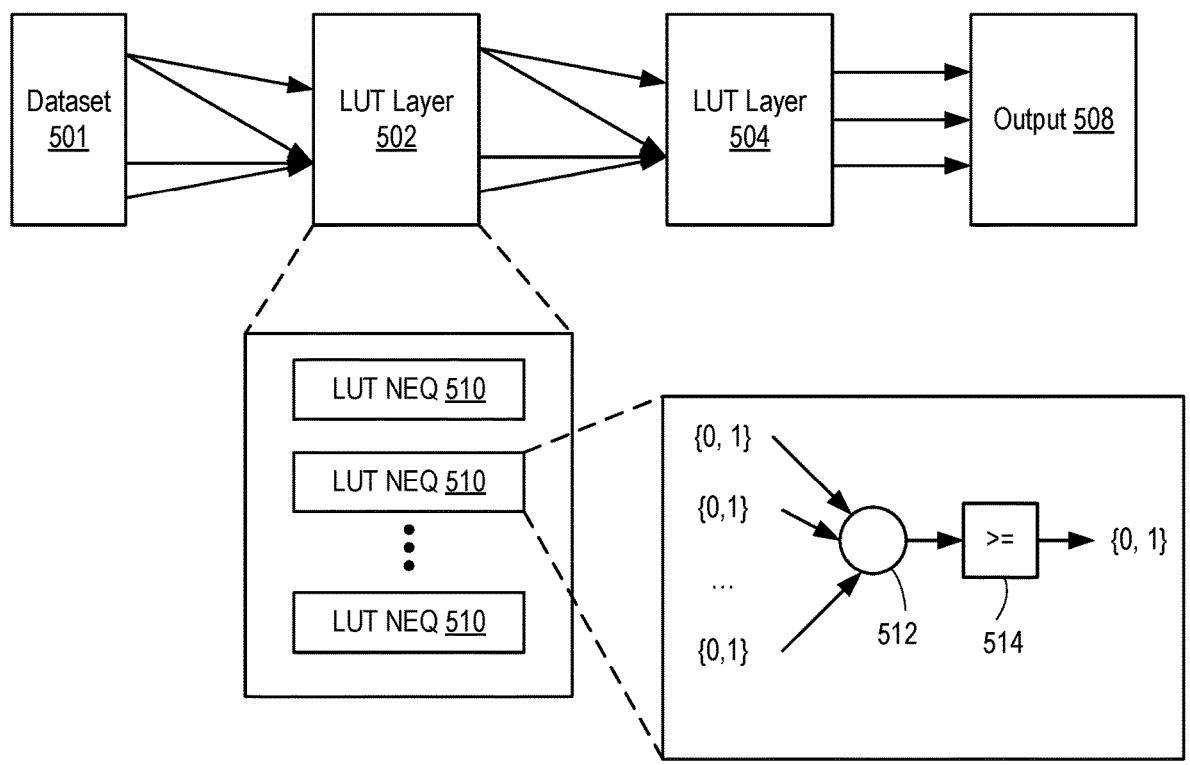
FIG. 5 is a block diagram showing an example neural network having a sparse graph topology.

From a theoretical standpoint, there are no limitations on the number and connectivity of NEQs. However, in practice, each NEQ will be mapped back to an HBB and the capacity and interconnect structure of the programmable device should be taken into account. For example, FIG. 5 is a block diagram showing an example neural network having a sparse graph topology. The neural network includes LUT layers 502 and 504, and output layer 508. A dataset 501 is applied to the LUT layer 502. The dataset 501 is sparsely connected to the LUT layer 502. The LUT layer 502 is sparsely connected to the LUT layer 504. The LUT layer 504 is fully connected to the output layer 508. Each LUT layer 502, 504 includes a plurality of LUT NEQs 510. Each LUT NEQ 510 includes a sum operator 512 and a nonlinear operator 514 (e.g., a greater than or equal to operator). In the example, each LUT layer is sparsely connected to the next layer, i.e., not every LUT input in level N+1 is directly connected to every LUT output in level N. This enables increasing the fan-in of output nodes without an exponential growth in width in previous layers and is reminiscent of multi-level logic synthesis. The pattern of connections between layers may be chosen randomly or according to a predetermined sparsity pattern that is known to be conducive to place-and-route algorithms. Additionally, in this scheme, the intermediate outputs generated in the middle of the hierarchy can be shared to generate new/different neuron outputs.

In an example, a user can generate a hybrid topology by including non-NEQ building blocks, such as standard convolutional layers, fully connected layers, pooling layers, and the like. However, in such case, the techniques described herein only apply to the NEQ portion of the topology. That is, the design tools 235 only map the NEQs in the topology to HBBs. The remaining non-NEQ portions of the topology, as well as the connectivity between the NEQ and non-NEQ portions, are mapped to hardware using conventional methods (e.g., by defining an overlay architecture and using a mapping-and-scheduling tools). For instance, a network that starts with regular floating-point convolutional layers and ends with LUT layers can be constructed, trained with backpropagation, then the first part is mapped to a fixed hardware architecture while the second part is converted directly into HBBs (e.g., LUTs, BRAMs, etc.).

As long as the NEQs from step 302 are differentiable, a topology constructed from NEQs (and optionally non-NEQ conventional deep learning layers) will be trainable using the backpropagation algorithm end-to-end. Since NEQs have quantized inputs and outputs, the straight-through estimator (STE) technique can be used to propagate gradients through the quantization functions, which has been shown to work well in practice for QNNs and BNNs. Since backpropagation is used for training, the techniques applied to improve standard neural network training, such as knowledge distillation and ensembling, can be applied.

Returning to FIG. 3, at step 306, the design tools 235 convert the trained network of NEQs into a netlist of HBBs using the conversion procedure. Once the topology is trained and the desired accuracy is reached, the conversion procedure from step 302 is applied to each NEQ to convert it into its equivalent HBB. Using the trained NEQ parameters obtained in step 304, the conversion procedure will evaluate each NEQ on each possible input combination to obtain an output. Each (input→output) mapping corresponds to one line of the truth table that the HBB needs to implement. Because of the quantized nature of NEQ inputs and outputs, the resulting HBB produces the same result as the NEQ for any input. Following this procedure for each NEQ results in a netlist of configured HBBs, where each HBB mimics the connectivity and functionality of the NEQ it was converted from.

At step 308, the design tools 235 optionally perform any post-process optimizations that can be applied to a netlist and generate an implementation for a target programmable device. For example, a heuristic logic minimizer can be applied to the netlist to use fewer LUTs; pipeline registers can be inserted between the layers to increase the clock frequency; or the netlist can be split into chunks for mapping to a smaller programmable device with dynamic partial reconfiguration, one chunk at a time. After any optional post-processing is complete, the final netlist is processed with a place-and-route algorithm to generate a bitfile for the programmable device. Notably, logic synthesis and technology mapping is not necessary since the HBBs corresponding to primitives in the target programmable fabric. The resulting design is massively parallel and identical to the trained network from step 304. In addition, unless the netlist was partitioned during optimization, the hardware implementation of the neural network can classify inputs at the clock rate of the circuit.

Figure 6A:
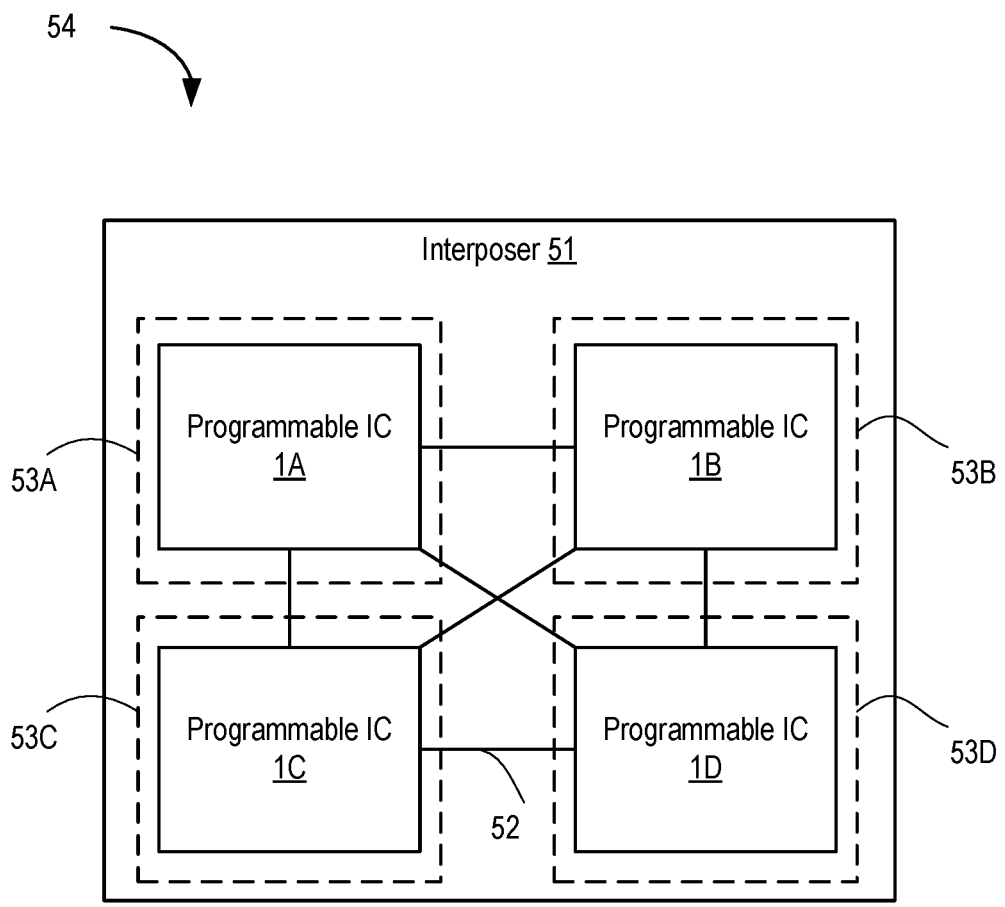
FIG. 6A is a block diagram depicting a multi-integrated circuit (IC) programmable device according to an example.

FIG. 6A is a block diagram depicting a programmable device 54 according to an example. The programmable device 54 can be used to implement the programmable device 128 in the hardware accelerator 122. The programmable device 54 includes a plurality of programmable integrated circuits (ICs) 1, e.g., programmable ICs 1A, 1B, 1C, and 1D. In an example, each programmable IC 1 is an IC die disposed on an interposer 51. Each programmable IC 1 comprises a super logic region (SLR) 53 of the programmable device 54, e.g., SLRs 53A, 53B, 53C, and 53D. The programmable ICs 1 are interconnected through conductors on the interposer 51 (referred to as super long lines (SLLs) 52).

Figure 6B:
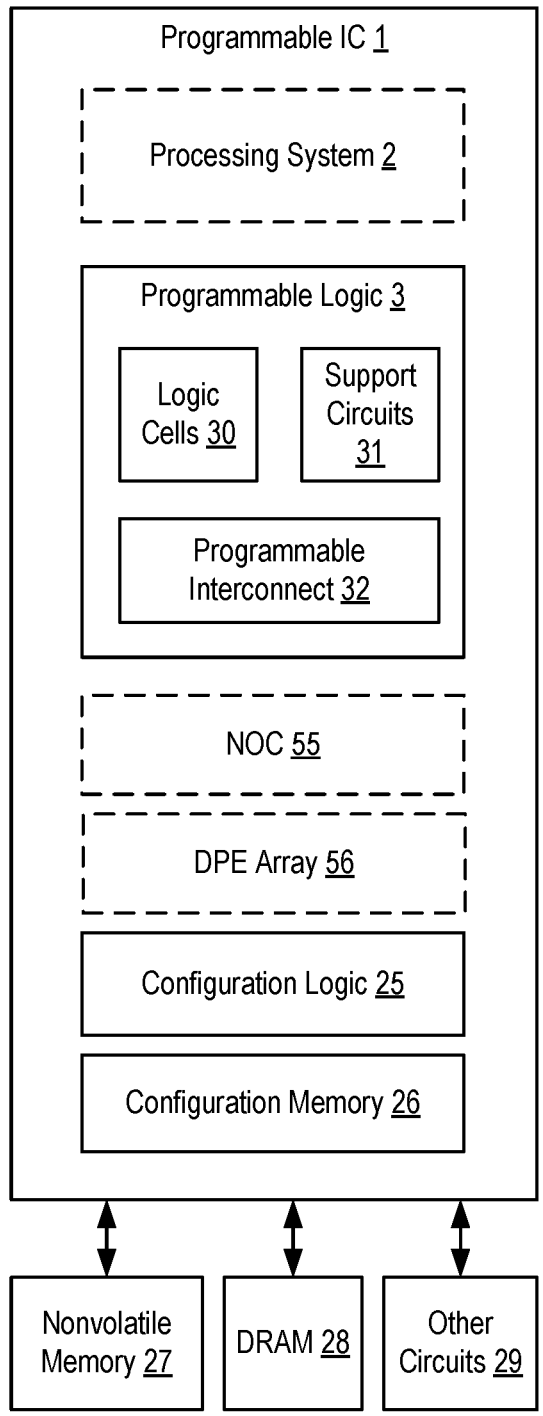
FIG. 6B is a block diagram depicting a programmable IC according to an example.

FIG. 6B is a block diagram depicting a programmable IC 1 according to an example. The programmable IC 1 can be used to implement the programmable device 128 or one of the programmable ICs 1A-1D in the programmable device 54. The programmable IC 1 includes programmable logic 3 (also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like. In some examples, the programmable IC 1 includes a network-on-chip (NOC) 55 and data processing engine (DPE) array 56. The NOC 55 is configured to provide for communication between subsystems of the programmable IC 1, such as between the PS 2, the PL 3, and the DPE array 56. The DPE array 56 can include an array of DPE's configured to perform data processing, such as an array of vector processors.

Figure 6C:
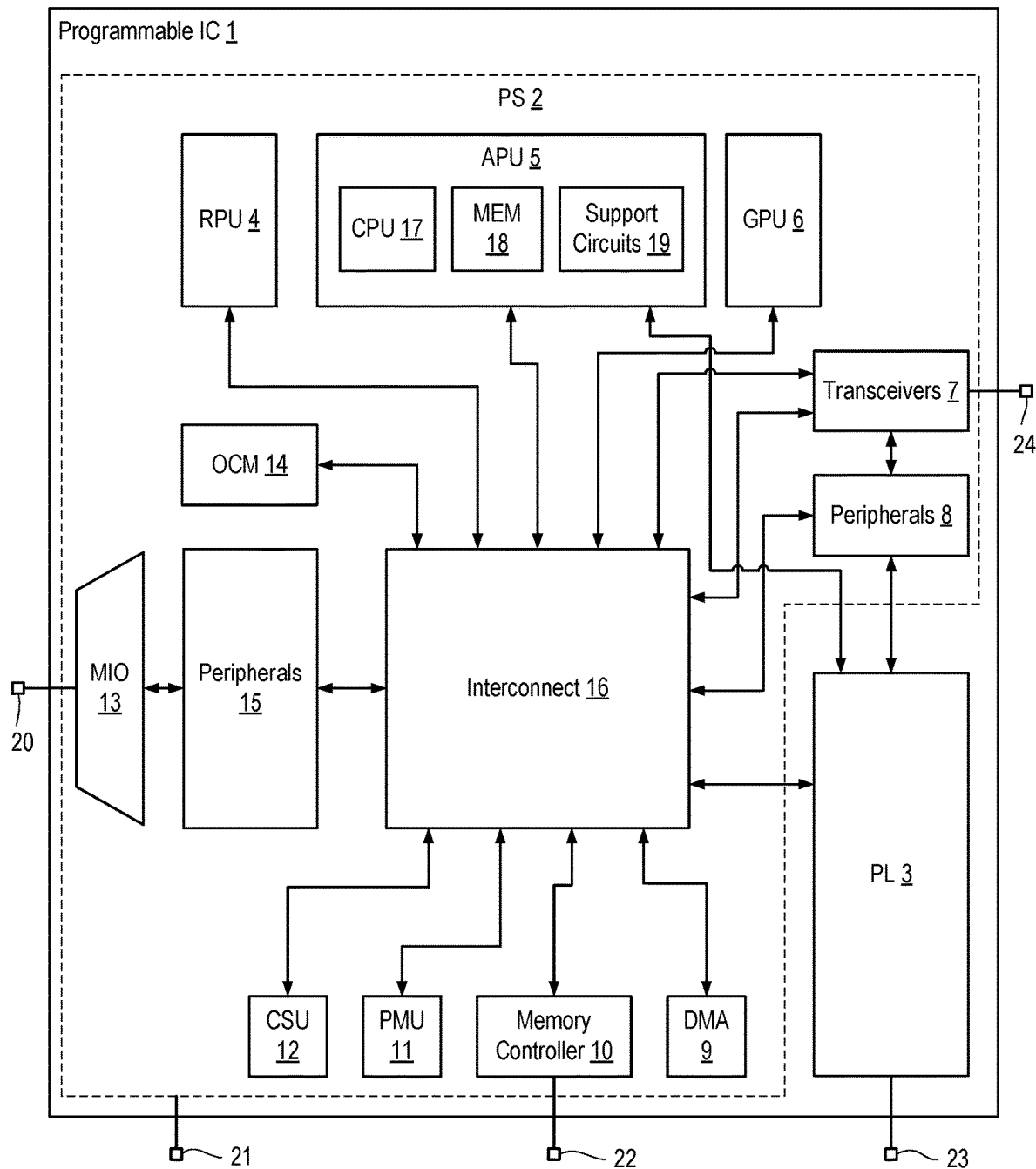
FIG. 6C is a block diagram depicting a System-on-Chip (SOC) implementation of a programmable IC according to an example.

FIG. 6C is a block diagram depicting an SOC implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed IO (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 6C, the programmable IC 1 can be used in the hardware accelerator 122 and can function as described above. The acceleration circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, multi-gigabit transceivers (MGTs), and the like.

Figure 6D:
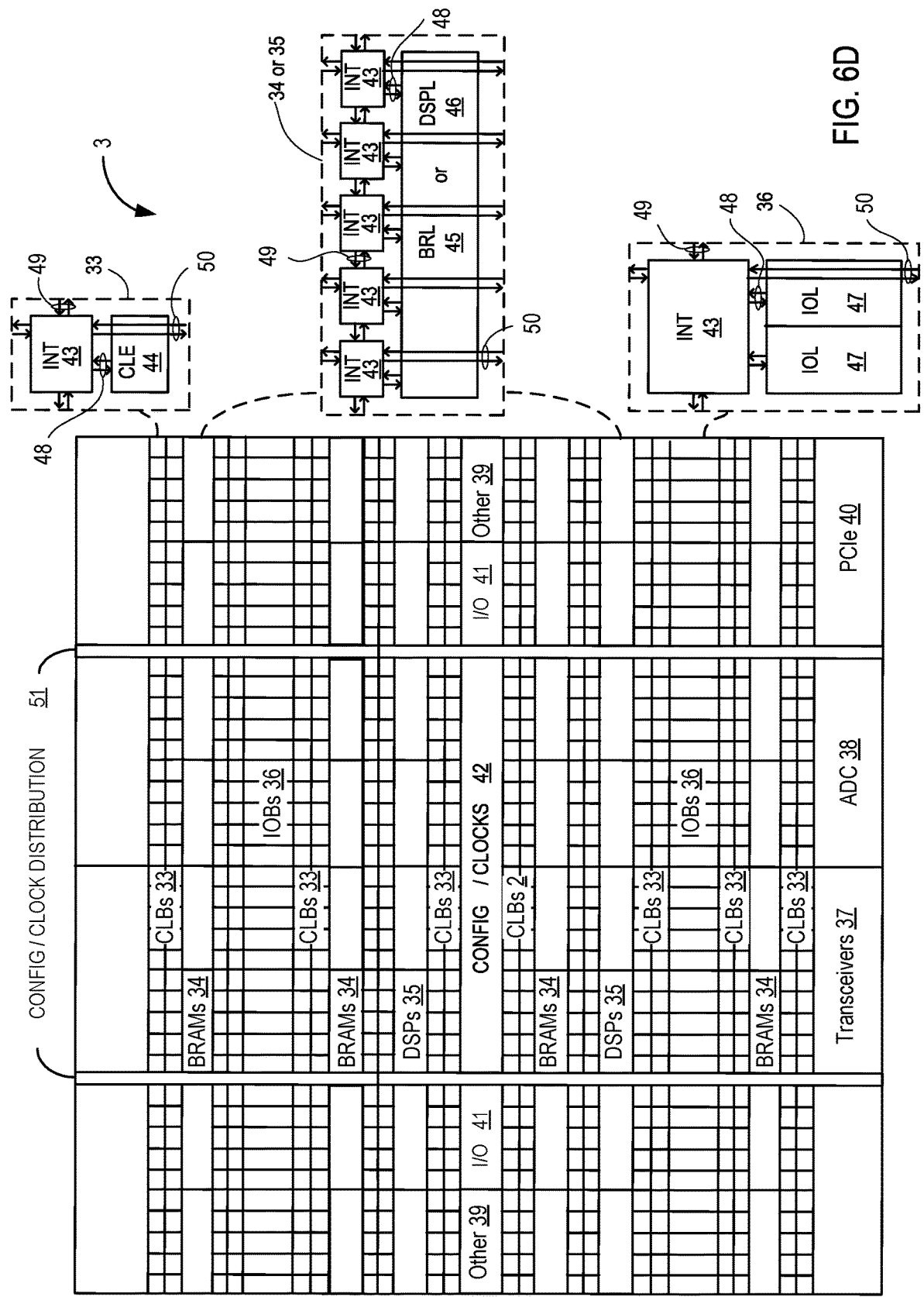
FIG. 6D illustrates a field programmable gate array (FPGA) implementation of a programmable IC according to an example.

FIG. 6D illustrates a field programmable gate array (FPGA) implementation of the programmable IC 1 that includes the PL 3. The PL 3 shown in FIG. 6D can be used in any example of the programmable devices described herein. The PL 3 includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The PL 3 can also include PCIe interfaces 40, analog-to-digital converters (ADC) 38, and the like.

In some PLs, each programmable tile can include at least one programmable interconnect element ("INT") 43 having connections to input and output terminals 48 of a programmable logic element within the same tile, as shown by examples included at the top of FIG. 6D. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 3D) is used for configuration, clock, and other control logic. Vertical columns 51 extending from this horizontal area or column are used to distribute the clocks and configuration signals across the breadth of the PL.

Some PLs utilizing the architecture illustrated in FIG. 6D include additional logic blocks that disrupt the regular columnar structure making up a large part of the PL. The additional logic blocks can be programmable blocks and/or dedicated logic. Note that FIG. 6D is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 6D are purely exemplary. For example, in an actual PL more than one adjacent row of CLBs is typically included wherever the CLBs appear, to facilitate the efficient implementation of user logic, but the number of adjacent CLB rows varies with the overall size of the PL.

Techniques for learning neural networks of programmable device blocks directly with backpropagation have been described. The novel techniques described above involve the realization that enforcing a fixed architecture on top of LUTs and other programmable device building blocks creates an optimization barrier for running neural networks on programmable devices. The techniques include a mapping between programmable device primitives and quantized neurons, including single LUTs and RAMs in different modes. The programmable device primitives can be exposed to a machine learning framework and trained with backpropagation. Multiple levels of binary neurons can be stacked and sparsely connected to increase the indirect fan-in, trained with backpropagation and STE in a machine learning framework, and then mapped into a network of LUTs to be placed onto a programmable fabric of a target programmable device.

While the foregoing is directed to specific examples, other and further examples may be devised without departing from the basic scope thereof, and the scope thereof is determined by the claims that follow.

What is claimed is:

1. A method, comprising:
constructing a neural network for a target programmable integrated circuit (IC) device, by a computing platform, such that neurons of the neural network correspond to respective programmable components of the target programmable IC device that are configurable as truth tables, wherein the programmable components comprise one or more of look-up tables (LUTs) and blocks of random access memory (BRAM), and wherein the neurons are configured to perform dot product operations and nonlinear operations based on trainable parameters of respective neurons; and
programming the programmable components of the target programmable IC device, by the computing platform, based on the respective neurons, wherein the programming comprises,
enumerating inputs of the neurons determining corresponding outputs of the neurons, and
programming the programmable components of the target programmable IC device based the enumerated inputs and the corresponding outputs of the respective neurons.

2. The method of claim 1, wherein the programming comprises:
converting the neural network to a netlist for the target programmable IC device,
converting the netlist to a bitfile for the target programmable IC device with a place and route tool, without performing logic synthesis; and
programming the programmable components of the target programmable IC device with the bitfile.

3. The method of claim 1, wherein the programmable components comprise the LUTs, wherein the programming comprises converting the neural network to a netlist for the target programmable IC device, and wherein the method, further comprises:
post-processing the netlist to reduce a number of the LUTs in the netlist.

4. The method of claim 1, wherein the programming comprises converting the neural network to a netlist for the target programmable IC device, the method further comprising:
post-processing the netlist to insert pipeline registers between layers of the neural network to increase a clock frequency.

5. The method of claim 1, wherein the programming comprises converting the neural network to a netlist for the target programmable IC device, the method further comprising:
separating the netlist into sections, such that the computing platform implements the neural network in sections with dynamic partial reconfiguration of the target programmable IC device between the sections.

6. The method of claim 1, wherein a first one of the neurons is further configured to receive quantized inputs and to provide quantized outputs, wherein a corresponding one of the programmable components comprises a first one of the BRAM, wherein a sum of widths of the quantized inputs is less than or equal to a number of address bits of the first BRAM, and wherein a sum of widths of the quantized outputs is less than or equal to a width of the first BRAM.

7. The method of claim 1, wherein one or more of the neurons is further configured to perform one or more operations between the dot product operation and the nonlinear operation.

8. A non-transitory computer readable medium having stored thereon instructions that, when executed by a processor, cause the processor to:
construct a neural network for a target programmable integrated circuit (IC) device such that neurons of the neural network correspond to respective programmable components of the target programmable IC device that are configurable as truth tables, wherein the programmable components comprise one or more of look-up tables (LUTs) and blocks of random access memory (BRAM), and wherein the neurons are configured to perform dot product operations and nonlinear operations based on trained parameters of the respective neurons;
program the programmable components of the target programmable IC device based on the respective neurons, including to,
enumerate inputs of the neurons and determine corresponding outputs of the neurons, and
program the programmable components of the target programmable IC devices based on the enumerated inputs and the corresponding outputs of the respective neurons.

9. The non-transitory computer readable medium of claim 8, further comprising instructions to cause the processor to program the programmable components of the target programmable IC device by:

converting the neural network to a netlist for the target programmable IC device;

converting the netlist to a bitfile for the target programmable IC device based on the netlist, without performing logic synthesis; and programming the programmable components of the target programmable IC device with the bitfile.

10. The non-transitory computer readable medium of claim 8, wherein the programmable components comprise the LUTs, further comprising instructions to cause the processor to:

program the programmable components of the target programmable IC device by converting the neural network to a netlist for the target programmable IC device; and post-process the netlist with a heuristic logic minimizer tool to reduce a number of the LUTs in the netlist.

11. The non-transitory computer readable medium of claim 8, further comprising instructions to cause the processor to:

program the programmable components of the target programmable IC device by converting the neural network to a netlist for the target programmable IC device; and post-process the netlist to insert pipeline registers between layers of the neural network to increase a clock frequency.

12. The non-transitory computer readable medium of claim 8, wherein:

a first one of neurons is further configured to receive quantized inputs and to provide quantized outputs;

a corresponding one of the programmable components comprises a first one of the BRAM;

a sum of widths of the quantized inputs is less than or equal to a number of address bits of the first BRAM; and a sum of widths of the quantized outputs is less than or equal to a width of the first BRAM.

13. The non-transitory computer readable medium of claim 8, wherein one or more of the neurons is further configured to perform one or more operations between the dot product operation and the nonlinear operation.

14. An apparatus, comprising:

a processor and memory configured to:

construct a neural network for a target programmable integrated circuit (IC) device, wherein the neural network comprises one or more look-up table (LUT) layers, wherein the LUT layers comprise neurons, wherein the neurons comprise trainable parameters, wherein the neurons correspond to respective programmable components of the target programmable IC device that are configurable as truth tables, and wherein the programmable components comprise one or more of LUTs and blocks of random access memory (BRAM); and train the neural network based on backpropagation to provide a trained neural network.

15. The apparatus of claim 14, wherein the processor and memory are further configured to:

program the programmable components of the target programmable IC device based on convert the trained neural network, including to, enumerate inputs of the neurons and determine corresponding outputs of the neurons, and program the programmable components of the target programmable IC device based on the enumerated inputs and the corresponding outputs of the respective neurons.

16. The apparatus of claim 14, wherein the programmable components comprise the LUTs, and wherein the processor and memory are further configured to:

convert the neural network to a netlist for the target programmable IC device; and post-process the netlist to reduce a number of the LUTS in the netlist.

17. The apparatus of claim 14, wherein the processor and memory are further configured to:

convert the neural network to a netlist for the target programmable IC device; and post-process the netlist to insert pipeline registers between layers of the neural network to increase a clock frequency.

18. The apparatus of claim 14, wherein:

a first one of neurons is further configured to receive quantized inputs and to provide quantized outputs;

a corresponding one of the programmable components comprises a first one of the BRAM;

a sum of widths of the quantized inputs is less than or equal to a number of address bits of the first BRAM; and a sum of widths of the quantized outputs is less than or equal to a width of the first BRAM.

19. The method of claim 1, wherein the programming further comprises: mapping the neurons of the neural network to the target programmable IC device without use of an overlay architecture and without use of a scheduling tool.

20. The method of claim 1, wherein the neural network further comprises non-neuron elements, the method further comprising:

mapping the non-neuron elements of the neural network to the target IC device by defining an overlay architecture and using mapping and scheduling tools.

21. The method of claim 1, wherein the programmable components of the target programmable IC device comprise multiple types of programmable components, and wherein the neurons comprise multiple corresponding types of neurons.

22. The method of claim 1, wherein the target programmable IC device comprises a field programmable gate array (FPGA).

23. The non-transitory computer readable medium of claim 8, further comprising instructions to cause the processor to:

program the programmable components of the target programmable IC device by converting the neural network to a netlist for the target programmable IC device; and separate the netlist into sections to implement the neural network in sections with dynamic partial reconfiguration of the target programmable IC device between the sections.

24. The apparatus of claim 14, wherein the processor and memory are further configured to:

convert the neural network to a netlist for the target programmable IC device; and separate the netlist into sections to implement the neural network in sections with dynamic partial reconfiguration of the target IC device between the sections.

* * * * *